US008740072B1

(12) United States Patent
Dorogusker

(10) Patent No.: US 8,740,072 B1
(45) Date of Patent: Jun. 3, 2014

(54) CONTACT ARRAY IN A CARD READER

(71) Applicant: Square, Inc., San Francisco, CA (US)

(72) Inventor: Jesse Dorogusker, Palo Alto, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 13/826,171

(22) Filed: Mar. 14, 2013

(51) Int. Cl.
*G06K 7/06* (2006.01)
(52) U.S. Cl.
USPC ............ 235/441; 235/380; 235/492; 235/449
(58) Field of Classification Search
USPC .......... 235/441, 380, 375, 492, 451, 449, 493
See application file for complete search history.

(56) References Cited

U.S. PATENT DOCUMENTS

| | | | | |
|---|---|---|---|---|
| 5,949,047 | A * | 9/1999 | Abe et al. ....................... | 235/435 |
| 8,336,771 | B2 * | 12/2012 | Tsai et al. ..................... | 235/380 |
| 2012/0011071 | A1 * | 1/2012 | Pennock et al. ................ | 705/75 |
| 2012/0052910 | A1 * | 3/2012 | Mu et al. ........................ | 455/558 |
| 2012/0097740 | A1 * | 4/2012 | Lamba et al. ................. | 235/380 |
| 2012/0305645 | A1 * | 12/2012 | Morley, Jr. .................... | 235/380 |
| 2013/0087614 | A1 * | 4/2013 | Limtao et al. ................. | 235/449 |
| 2013/0130743 | A1 * | 5/2013 | Lin ............................... | 455/557 |

OTHER PUBLICATIONS

*Identification Cards—Integrated Circuit Cars—Part 2: Cards With Contacts—Dimensions and Location of the Contacts.* International Standard. ISO/IEC 7816-2. Second Edition. Published Oct. 15, 2007. 14 Pages.
*Identification Cards—Integrated Circuit Cars—Part 3: Cards With Contacts—Electrical Interface and Transmission Protocols.* International Standard. ISO/IEC 7816-3. Third Edition. Published Nov. 1, 2006. 58 Pages.

* cited by examiner

*Primary Examiner* — Edwyn Labaze
(74) *Attorney, Agent, or Firm* — Fish & Richardson P.C.

(57) ABSTRACT

A card reader, comprising: a frame having a slot for insertion of a chip card that has a plurality of card contacts, wherein the slot has open sides that allow the chip card to move laterally during the insertion; a plurality of reader contacts coupled to the frame and positioned in the slot in a position to be contacted by the card contacts when the chip card is inserted in the slot, and circuitry configured to communicate with the chip card through the plurality of card contact, wherein there are more reader contacts than card contacts and the circuitry is configured to determine which subset of the reader contacts engages the card contacts and to communicate with the chip card through the subset of reader contacts.

16 Claims, 7 Drawing Sheets

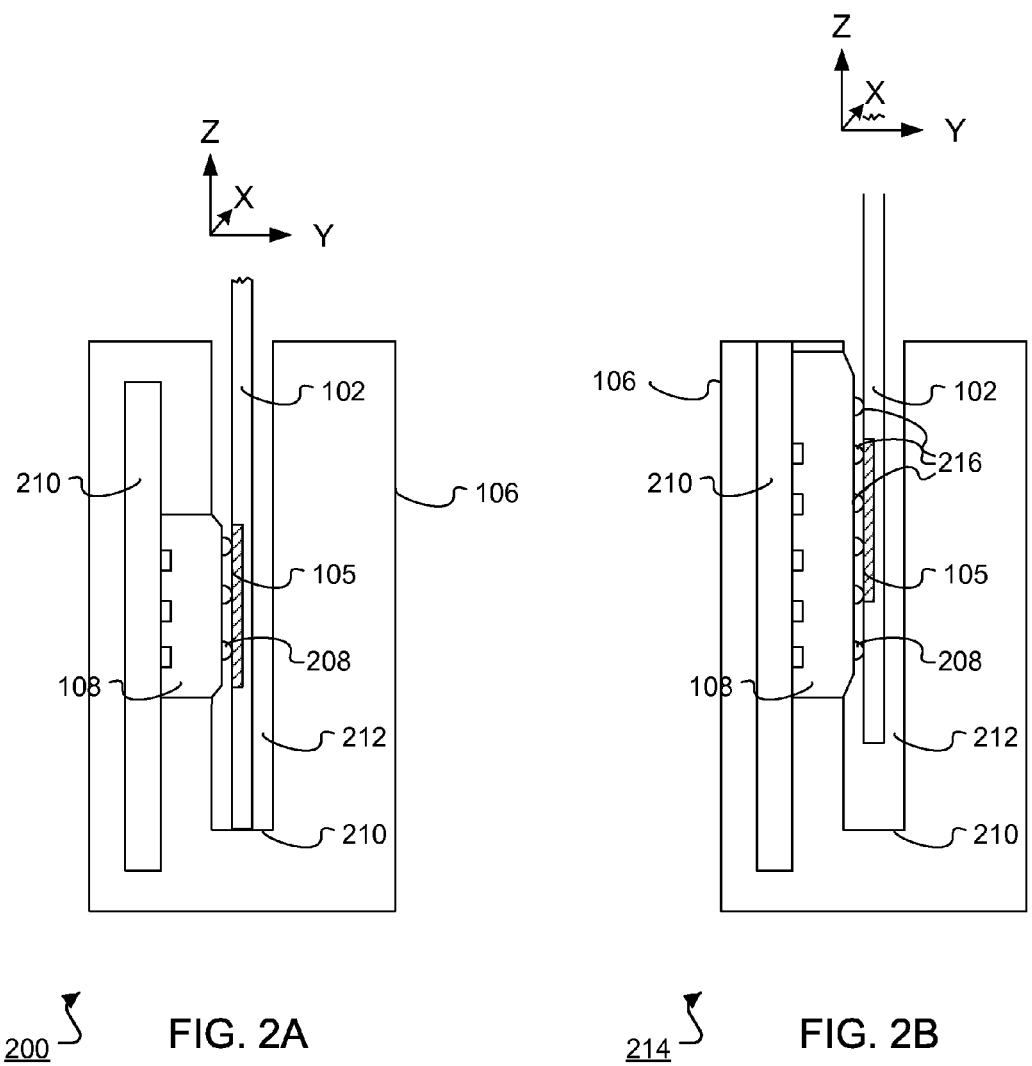

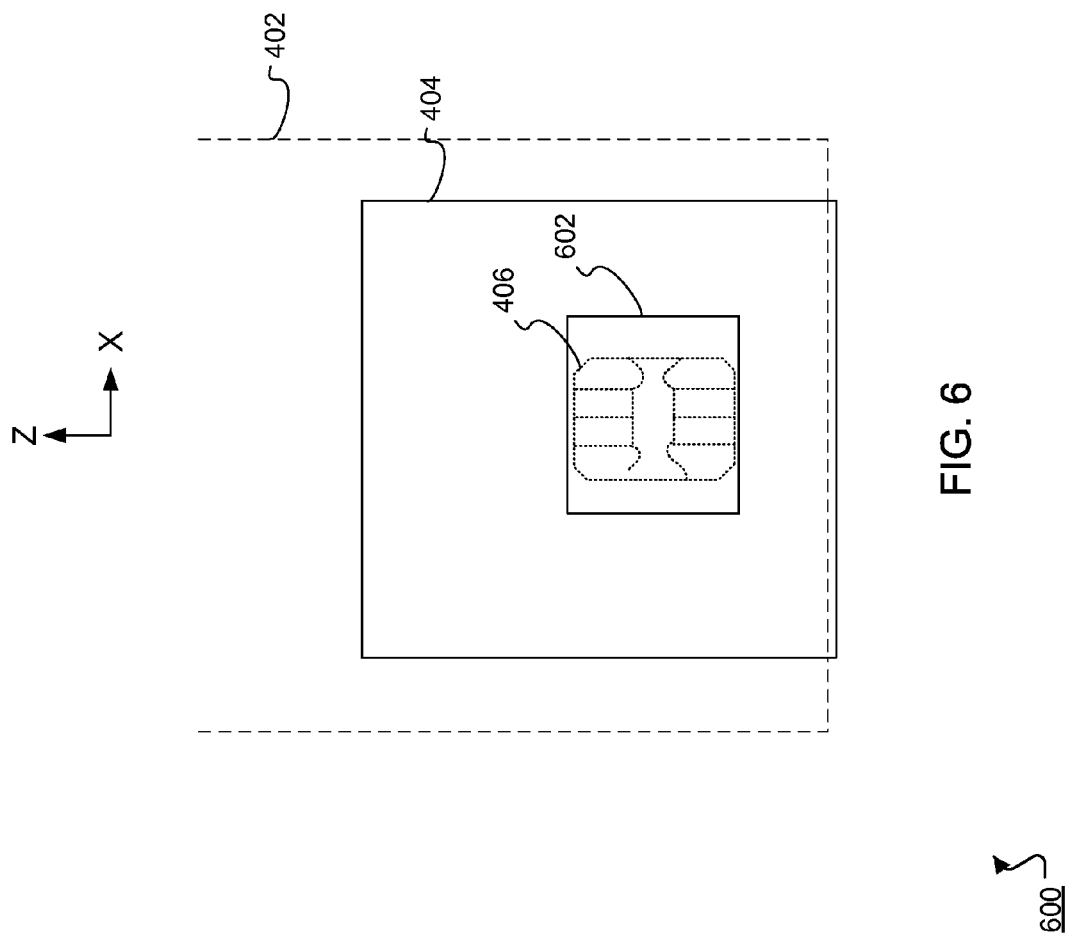

CONTACT ARRAY IN A CARD READER

TECHNICAL FIELD

This disclosure relates to a mobile card reader.

BACKGROUND

Chip cards, e.g., Europay, Mastercard, Visa (EMV) cards, are cards that include an integrated circuit that can provide authentication, identification, and application processing for conducting a transaction. In some implementations, the integrated circuit stores sensitive data, e.g., a personal identification number (PIN). Chip card readers can read data from the integrated circuit on the chip card and provide the data to a host, e.g., a computer or point of sale terminal or mobile wireless device.

To perform a transaction using a chip card and a chip card reader, a user inserts the chip card into the chip card reader. The integrated circuit of the chip card resides at a predetermined position on the chip card, e.g., according to standard chip card specifications. Generally, housing of the chip card reader includes sides that are wide enough, e.g., slightly wider than the chip card, to form a close-ended groove so, upon insertion, the ends of the groove constrain the chip card so that the chip card will not move laterally. The chip card reader also can read the chip card using circuitry positioned over the integrated circuit when the chip card reaches a final position inside the groove.

The circuitry can be a printed circuit board that interacts with the integrated circuit. When the chip card is inserted into the chip card reader, the printed circuit board can be coupled to contacts that come into physical contact with contacts of the chip card's integrated circuit. The chip card reader can communicate with the chip card reader through the contacts using standard communication protocols, e.g., the EMV ISO/IEC 7816-3 transmission protocol, to conduct a transaction.

SUMMARY

Chip card readers can be bulky because of their many components. Generally, the components have been designed to emphasize function as opposed to both function and size. For example, a typical point of sale system might include a housing that includes a combined touch display or keypad and a slot to insert the card. The housing can also have closed sides with a fixed width to direct the card, upon insertion, to a final position within a groove of the housing. Miniaturization is not a particular concern in this environment. However, as card readers become more mobile, they may need to smaller and thinner to increase overall convenience of use and card reader portability.

The width of a chip card reader can be reduced by using a contact array. Instead of having closed sides, the card reader can have open sides that allow the card to move laterally when inserted into a slot. The card reader can include an array of contacts coupled to a frame of the card reader. The array of contacts can have more contacts than a number of contacts on an integrated circuit of the chip card. The card reader can determine which contacts of the array of contacts, e.g., reader contacts, are in contact with the contacts of the integrated circuit, e.g., card contacts, and the card reader can select those reader contacts to communicate with the chip card.

In one aspect, a card reader, comprising: a frame having a slot for insertion of a chip card that has a plurality of card contacts, wherein the slot has open sides that allow the chip card to move laterally during the insertion; a plurality of reader contacts coupled to the frame and positioned in the slot in a position to be contacted by the card contacts when the chip card is inserted in the slot, and circuitry configured to communicate with the chip card through the plurality of card contact, wherein there are more reader contacts than card contacts and the circuitry is configured to determine which subset of the reader contacts engages the card contacts and to communicate with the chip card through the subset of reader contacts.

Implementations can include one or more of the following features. Density of the plurality of reader contacts on the frame is twice as high as density of the plurality of card contacts. The subset of contacts are positioned to engage with the plurality of card contacts when the insertion of the chip card reaches a bottom edge of the card reader. An audio jack comprising circuitry configured to communicate with a mobile device. Circuitry configured to communicate with magnetic stripe cards. The frame comprises a transparent panel that overlays at least a portion of the plurality of reader contacts. Circuitry that displays an indication when the subset of reader contacts is selected. Circuitry that outputs an audio signal when the subset of reader contacts is selected. Circuitry is configured to perform operations comprising: applying, for one or more reader contacts in the plurality of reader contacts, power to the respective contact; measuring, for the one or more reader contacts, whether power is being drawn from the respective contact; and selecting the subset of reader contacts based on whether power is drawn from the one or more reader contacts.

In another aspect, a method of reading a chip card using a card reader, comprising: applying, for one or more reader contacts in a plurality of reader contacts, power to the respective contact; measuring, for the one or more reader contacts, whether power is being drawn from the respective contact; and selecting a subset of reader contacts based on whether power is drawn from the one or more reader contacts.

Implementations can include one or more of the following. Applying the power at the respective contact further comprises testing protocol responses at the respective contact. Determining whether the protocol responses conform to a technical specification; and selecting the subset of reader contacts based on the protocol response. The power is consecutively applied at each reader contact until power is drawn from a particular reader contact. Each reader contact is associated with a respective position, selecting the subset of reader contacts comprises: determining power is being drawn from a first reader contact; determining a plurality of positions based on a position of the first reader contact and a technical specification; selecting the subset of reader contacts based on the plurality of positions. The technical specification conforms to the Europay, Mastercard, Visa Protocol.

Advantages may include one or more of the following. Width of the card reader can be reduced because the sides of the card reader are open rather than closed. The card reader can include a contact array to allow for multiple positions for chip card insertion. That is, as long as an integrated circuit of the card reader is inserted somewhere into the card reader, the card reader can communicate with the card. The card reader can provide user feedback that indicates the chip card is properly inserted. For example, the card reader can include a transparent panel that a user can use to align the chip card with the card reader. The card reader can also provide a visual, e.g., an light emitting diode (LED), or audio, e.g., through a speaker, signal that indicates the card reader is communicating with the chip card.

BRIEF DESCRIPTION OF THE DRAWINGS

FIG. 2A is a side view of an example architecture for a system using a card reader.

FIG. 2B is a side view of another example architecture for a system using a card reader.

FIG. 6 is a front view of the example card reader with a transparent panel.

Like reference numbers and designations in the various drawings indicate like elements.

DETAILED DESCRIPTION

Figure 1A:
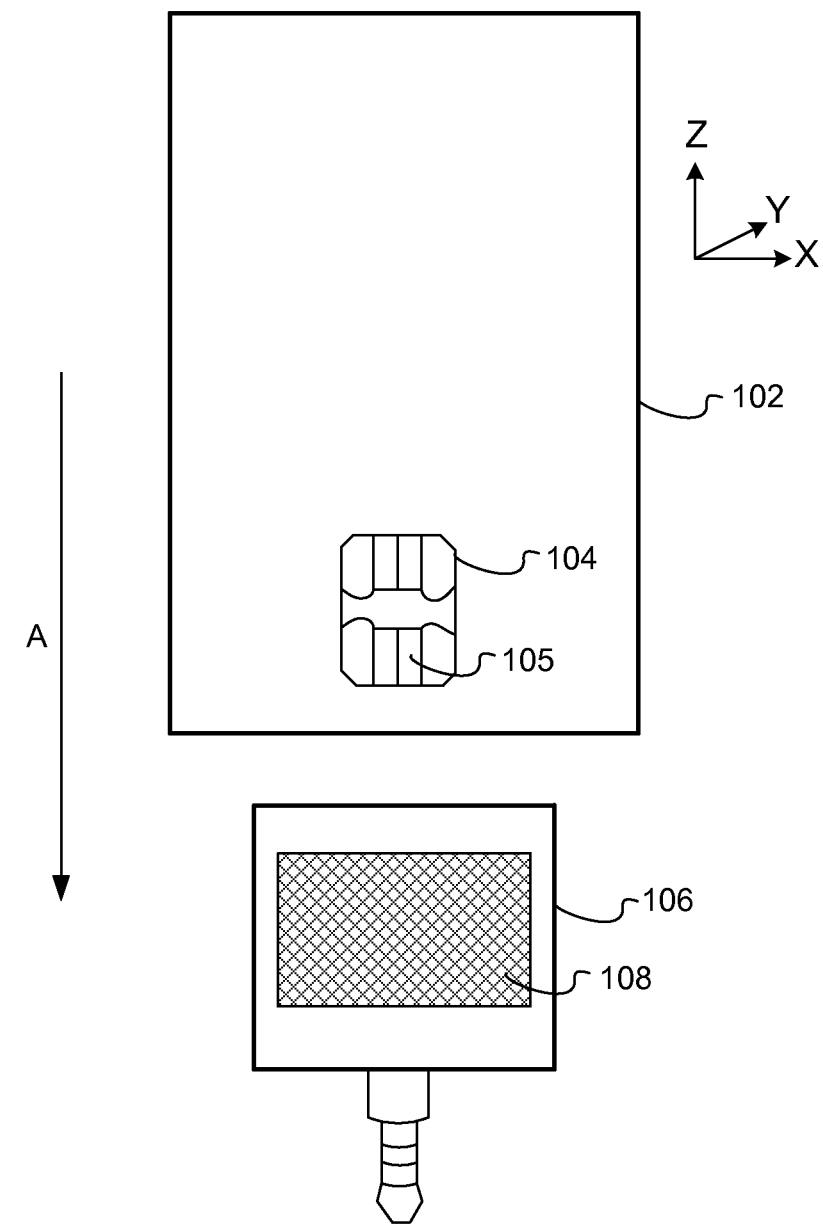
FIG. 1A is a schematic diagram of a chip card being inserted into a card reader.

FIG. 1A is a schematic diagram 100 of a chip card 102 being inserted into a card reader 106. The chip card 102, also known as an EMV card or a smart card, includes an integrated circuit (IC) 104 (shown in phantom), also known as a chip, on the card 102. The IC 104 generally resides at a predetermined position on the chip card 102. For example, the predetermined position can be dictated by specifications for manufacturing chip cards.

The IC 104 can have a contact area comprising several conductive contact pads 105 (also referred to in this description as "card contacts"), e.g., gold-plated contact pads. For example, according to the ISO/IEC 7816 specification, a standard for chip cards, the IC 104 includes eight contacts 105. A first card contact can be used as Vcc (supply voltage) to power the card. A second card contact can be used as a GND output. A third card contact can be used as a serial input and output. Other card contacts can receive a clock signal, a variable supply voltage, or can be reserved for future use. When functioning properly, the contacts also draw a standard amount of power as defined by the specification. The specification also defines position of each of the contacts relative to each other and to edges of the chip card, e.g., the supply voltage contact should be 5 mm from the GND contact and 2 mm from a reset contact.

The chip card 102 can be inserted into a card reader 106, e.g., in a vertical direction as shown by an arrow A in FIG. 1A. The card reader 106 includes a slot 212 (see FIG. 1B) to receive the chip card 102. Upon insertion, when the chip card 102 reaches a bottom edge of the card reader 106, the contacts 105 come in contact with a portion of a contact array 108, which resides on an inside face of the slot. The contact array 108 comprises many contacts (also referred to in this description as "reader contacts"), each of which can engage with any of the contacts of the IC 104. For example, the contact array 108 can include more than thirty contacts. The contact array 108 can cover an area spanning up to an entire width of the card reader 106. In this way, as long as the IC 104 is positioned within the area of the contact array 108, the card reader 106 can communicate with the chip card 102. The contact array 108 will be discussed further below in reference to FIGS. 4A-B. Although FIG. 1 shows the chip card 102 is wider than the card reader 106, the contact array 108 can still be used if the card reader 106 is wider than the chip card 102.

The card reader 106 can also include an audio jack. When the chip card 102 is inserted into the card reader 106, the card reader 106 can transfer data between the chip card 102 and a device, e.g., a mobile device, e.g., a smartphone or tablet computer, using the audio jack. In some implementations, the card reader 106 processes magnetic stripe cards in addition to chip cards. The card reader 106 can include other mobile device connections instead of, or in addition to, the audio jack, e.g., micro-universal serial bus (microUSB), Bluetooth, or other wireless hardware.

Figure 1B:
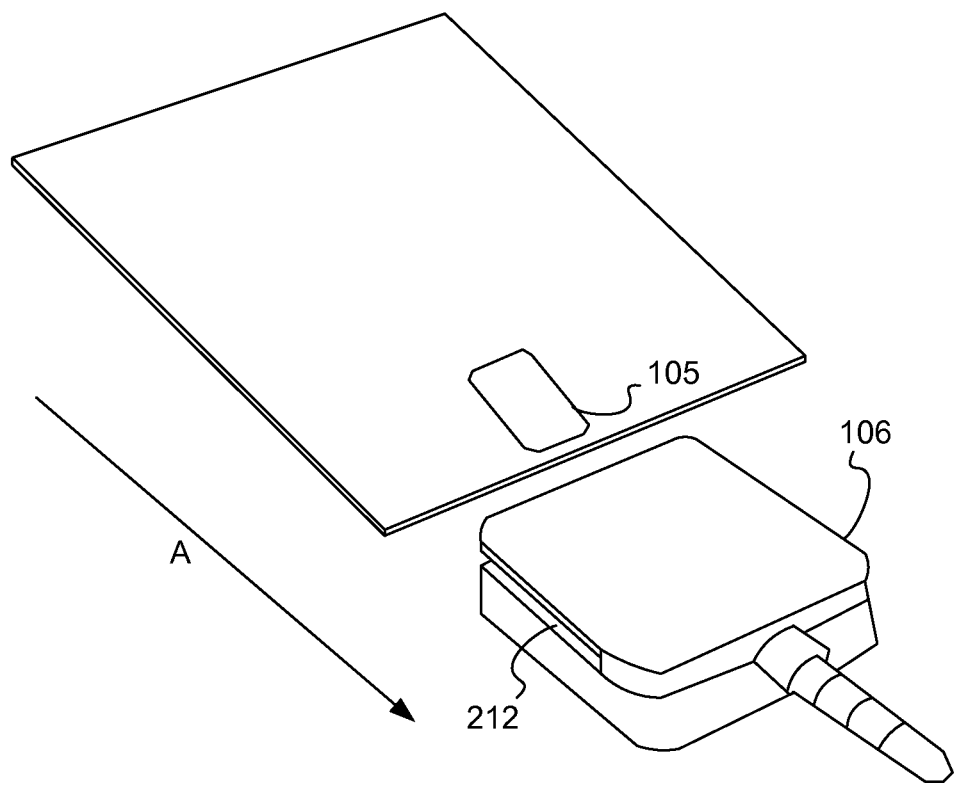
FIG. 1B is a perspective view of the chip card being inserted into the card reader.

FIG. 1B is a perspective view 110 of a chip card having contacts 105 being inserted into a card reader 106. The card reader 106 can read the contacts 105 using the contact array 108.

FIG. 2A is a side view 200 of an example architecture for the card reader 106. The card reader 106 includes a frame having a slot 212 for insertion of a chip card 102. The slot 212 can have a bottom edge 210 that stops the chip card 102 from being inserted deeper into the slot 212. The bottom edge 210 is positioned at a predetermined depth from a starting point of the insertion such that the contacts 105 of the chip card align with contacts 208 of the contact array 108 once the chip card 102 rests on the bottom edge 210. The slot has open sides, which allows the chip card 102 to move laterally, e.g., in the X-direction as shown in FIG. 2A. The chip card 102 includes contacts 105, e.g., as described above in reference to FIG. 1A. The card reader 106 includes circuitry 210 configured to communicate with the chip card 102. The circuitry 210 can include a contact array 108. The contact array 108 can include contacts 208 that engage the contacts 105 of the chip card 102.

FIG. 2B is a side view 214 of another example architecture for a system using a card reader. In some implementations, the chip card 102 engages with the card reader 106 without resting on the bottom edge 210. For example, the contact array 108 can have additional contacts 216 that are positioned to engage with contacts 105 of the chip card 102 even if the chip card 102 is partially inserted into the card reader 106.

The card reader 106 monitors voltage and/or current flow at various contacts 208, 216 to determine position of the contacts 105 relative to the card reader. Generally, applying a voltage signal to 105 will result in received signals at contacts 208, 216. At least one of the contacts 105 will have a predictable response to an applied voltage, e.g., as specified in a specification for the chip card. Once the card reader 106 matches a contact 208 to a particular contact from the contacts 105, the card reader 106 can identify the remaining contacts 208, 216 according to the specification. This is described further below in reference to FIG. 3.

Figure 3:
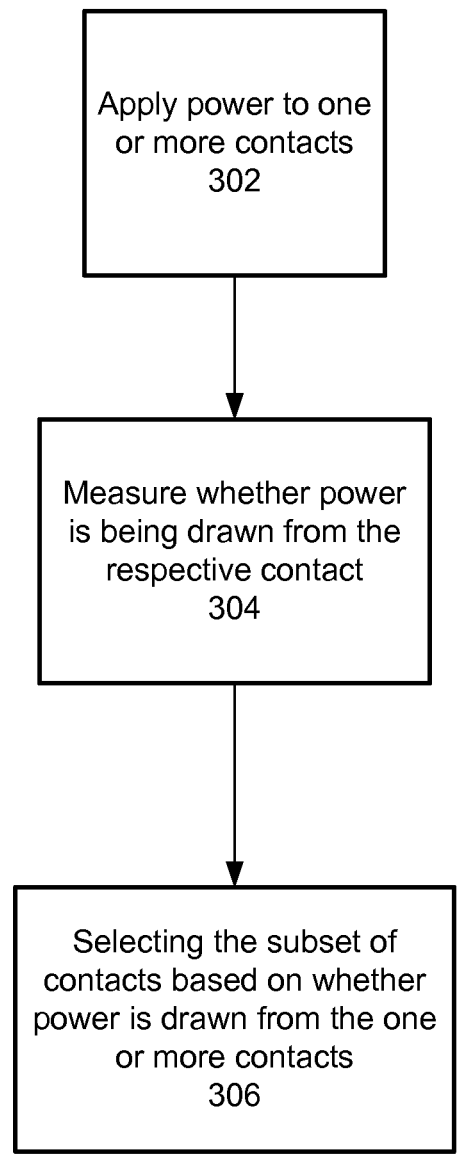
FIG. 3 is a flow chart of an example method of reading a chip card using the card reader.

FIG. 3 is a flow chart 300 of an example method of reading a chip card using the card reader. For convenience, the method will be described with respect to the card reader and chip card as described above in reference to FIG. 1A. The card reader applies power to one or more contacts in a contact array (step 302). The card reader then measures, for the one or more contacts, whether power is being drawn from the respective contact (step 304). The card reader can start applying power at a first contact and continue with contacts that are contiguous to the first contact. For example, at the beginning, the card reader can select the first contact to be a top left contact of the contact array because a supply voltage contact of the IC can be at a top left most position of the IC.

If the first contact is not engaged with a contact of the IC of the chip card, no power will be drawn from the card reader. The card reader can select a second contact that has not yet been tested, e.g., a contact next to the first contact, and repeat the process until the card reader engages with a contact of the IC. By starting at the top left most contact of the contact array and moving from left to right and top to bottom, the card reader can ensure the contact that first draws power from the chip card will be the supply voltage contact of the IC.

If a contact of the contact array is engaged with a contact of the IC, the chip card draws power from the card reader. In some implementations, the card reader detects an amount of drawn power and compares the amount to a predetermined amount of power that the contact is supposed to draw, e.g., as determined by the ISO/IEC 7816 specification, which conforms to the EMV protocol. If the amounts are substantially equal, the card reader can identify what function the contact in the contact array should be when communicating with the chip card. By way of illustration, the card reader can apply power to a contact and can detect 500 milliwatts (mW) is being drawn from the contact. The specification for chip cards can specify the supply voltage contact requires 5 W of power. Because the power amounts match, the chip card can identify the contact in the contact array should act as a supply voltage to the chip card.

Based on the identified function of the contact and the specification of how contacts on the IC are arranged, the card reader can select a subset of contacts in the contact array that engage with the IC (step 306). For example, the card reader can select seven other contacts next to the contact that conform to positions defined in the specification, e.g., an example is described further below in reference to FIGS. 4A-B. The card reader can also identify respective functions for each contact as defined in the specification. In some implementations, instead of identifying one contact and then extrapolating functions and positions of the other contacts, the card reader repeats steps 302 and 304 until the card reader identifies, by individually applying and comparing power at each contact, functions and positions for all contacts in the contact array that draw power from the chip card.

Once the subset of contacts is selected, the card reader can apply power through the subset to the contacts of the IC and communicate with the chip card, e.g., for conducting a financial transaction.

In some implementations, instead of determining whether power is drawn, the card reader tests protocol responses when applying power to one or more contacts. Similarly, the card reader can test default logic levels or detect edges of the card contact. For example, based on the specification, the card reader can expect a response from the chip card based on power being applied to the supply voltage and GND contacts of the IC. If the card reader receives the response as defined in the specification, the card reader can determine, based on the response, the function of the contact and position of the other contacts in the contact array.

Figures 4A, 4B:
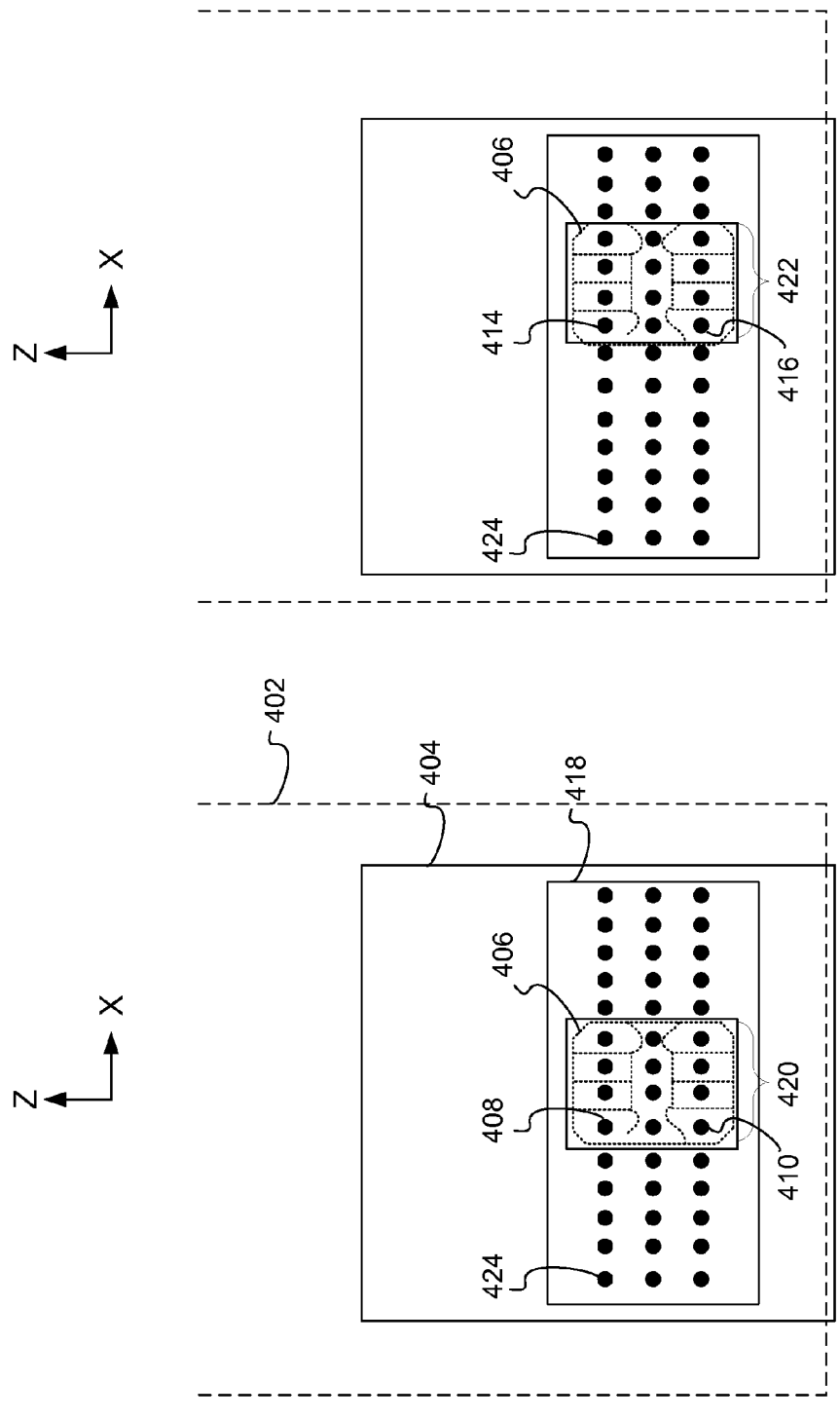
FIGS. 4A-B are front views of the example card reader with a contact array and a chip card inserted into the card reader.

FIGS. 4A-B are front views 400, 412 of the example card reader 404 with a contact array 418 and a chip card 402 having an integrated circuit 406 inserted into the card reader 404. The contact array 418 can span up to a width of the card reader 404. Therefore, the card 402 can be inserted in different positions while still being accessed by the contact array 418.

For example, in reference to FIG. 4A, the chip card 402 having the integrated circuit 406 is inserted and rests at a bottom edge of the card reader 404. The card reader 404 can determine which contacts to use, e.g., through the method described above in reference to FIG. 3. In particular, the card reader 404 can start by testing whether a contact of the integrated circuit 406 is at contact 424. Since contact 424 does not engage with any contact of the integrated circuit 406, the card reader 404 continues until determining contact 408 and contact 410 engage with pins of the integrated circuit 406. For example, the card reader 404 can determine contact 408 and contact 410 are the ground and supply voltage contacts, respectively, e.g., by testing protocol responses or comparing an amount of power drawn as described above in reference to FIG. 3. The card reader 404 can then determine, based on a specification, to engage with the contacts within area 420 to communicate with the card 402.

If the card 402 is inserted at a slightly shifted position, e.g., as shown in FIG. 4B, the card 402 is slightly inserted to the right of the card 402 shown in FIG. 4A, the card reader 404 can determine which contacts should engage with the integrated circuit 406. In particular, in reference to FIG. 4B, contacts 414 and 416 can be determined to be the ground and supply voltage contacts, respectively, and contacts within area 422 can be determined to engage with contacts of the integrated circuit 406.

Figure 5:
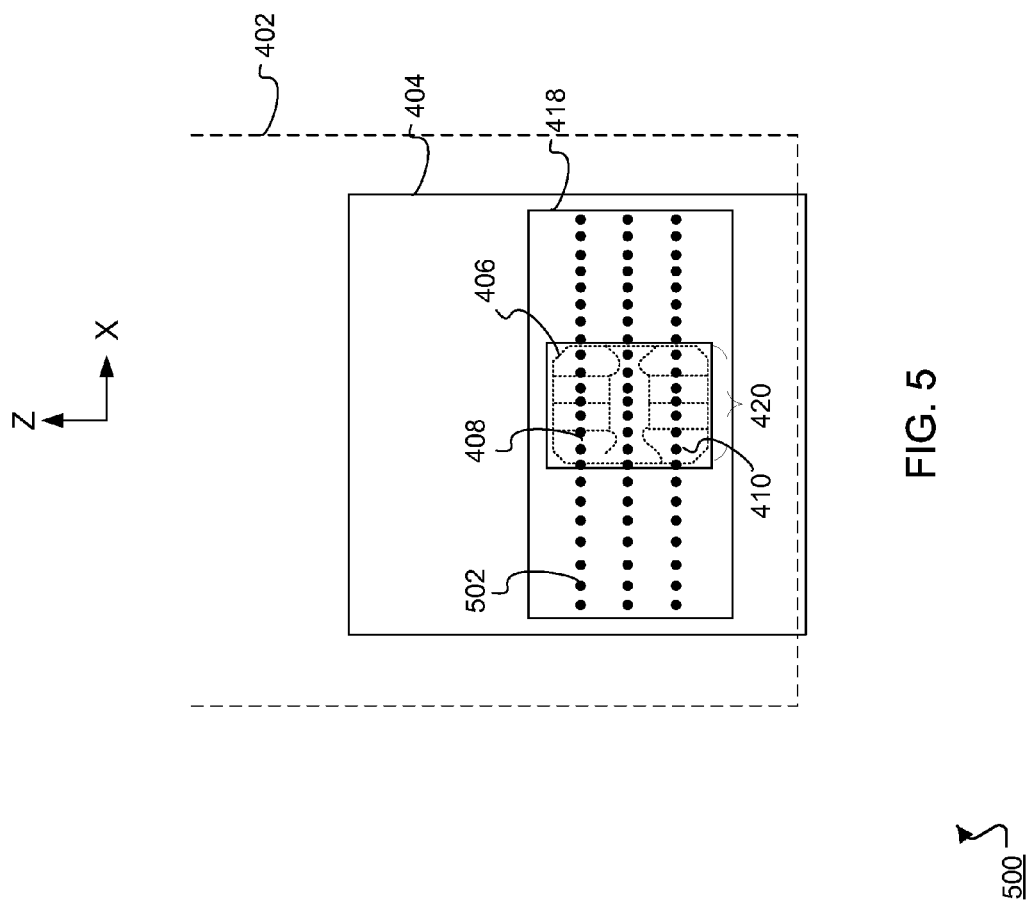
FIG. 5 is a front view of the example card reader with a high density contact array 418.

FIG. 5 is a front view 500 of the example card reader 404 with a high density contact array 418. In some implementations, density of the contacts 502 in the contact array 418 is higher than density of contacts in the integrated circuit 406. For example, the density in the contact array can be twice as high as the density of contacts in the integrated circuit 406. In this way, no matter how the card 402 is inserted, contacts within the contact array 418 can engage with contacts of the integrated circuit 406. By way of illustration, if a first contact lies equally between contacts of the integrated circuit 406, e.g., the first contact engages with more than one contact of the integrated circuit 406, contacts contiguous to the first contact in the contact array 418 will be directly engaged with the contacts of the integrated circuit 406.

FIG. 6 is a front view 600 of the example card reader 404 with a transparent panel 602. In some implementations, the card reader 404 includes a transparent panel 602 that overlays a portion of the contact array. The transparent panel 602 can be sized to be slightly larger than an area of the integrated circuit 406. The contact array can have the portion of contacts align with the transparent panel such that when a card is inserted into the card reader 404 in a direction that aligns the integrated circuit 406 with the transparent panel, the card reader 404 can communicate with the card 402. The transparent panel can provide visual feedback to the user indicating the card 402 was correctly inserted into the card reader 404.

In some implementations, the card reader 404 includes circuitry that displays an indication when the card reader 404 determines which set of contacts in the contact array 418 to use. For example, in reference to FIG. 4A, the card reader 404 can flash, e.g., through an LED, a light when the card reader 404 determines to use contacts within area 420 to communicate with the card 402. Alternatively, the card reader 404 can include circuitry that outputs an audio signal, e.g., a beep, when contacts in the contact array 418 are selected.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A card reader, comprising:
a frame having a slot for insertion of a financial transaction card, the financial transaction card having a plurality of card contacts to communicate with an integrated circuit embedded in the financial transaction card, wherein the slot has open sides that allow the financial transaction card to move laterally during the insertion;
a plurality of reader contacts coupled to the frame and positioned in the slot in a position to be contacted by the card contacts when the financial transaction card is inserted in the slot; and
circuitry configured to communicate with the integrated circuit embedded in the financial transaction card through the plurality of card contacts, wherein there are more reader contacts than card contacts and the circuitry is configured to determine which subset of the reader contacts engages the card contacts and to communicate with the financial transaction card through the subset of reader contacts.

2. The card reader of claim 1, where density of the plurality of reader contacts on the frame is twice as high as density of the plurality of card contacts.

3. The card reader of claim 1, where the subset of contacts are positioned to engage with the plurality of card contacts when the insertion of the financial transaction card reaches a bottom edge of the card reader.

4. The card reader of claim 1, further comprising an audio jack comprising circuitry configured to communicate with a mobile device.

5. The card reader of claim 1, further comprising circuitry configured to communicate with magnetic stripe cards.

6. The card reader of claim 1, where the frame comprises a transparent panel that overlays at least a portion of the plurality of reader contacts.

7. The card reader of claim 1, further comprising circuitry that displays an indication when the subset of reader contacts is selected.

8. The card reader of claim 1, further comprising circuitry that outputs an audio signal when the subset of reader contacts is selected.

9. The card reader of claim 1, where the circuitry is configured to perform operations comprising:
applying, for one or more reader contacts in the plurality of reader contacts, power to the respective contact;
measuring, for the one or more reader contacts, whether power is being drawn from the respective contact; and
selecting the subset of reader contacts based on whether power is drawn from the one or more reader contacts.

10. A method of reading a chip card using a card reader, comprising:
applying, for one or more reader contacts in a plurality of reader contacts, power to the respective contact;
measuring, for the one or more reader contacts, whether power is being drawn from the respective contact; and
selecting a subset of reader contacts based on whether power is drawn from the one or more reader contacts.

11. The method of claim 10, where applying the power at the respective contact further comprises testing protocol responses at the respective contact.

12. The method of claim 11, further comprising:
determining whether the protocol responses conform to a technical specification; and
selecting the subset of reader contacts based on the protocol response.

13. The method of claim 10, where the power is consecutively applied at each reader contact until power is drawn from a particular reader contact.

14. The method of claim 10, where each reader contact is associated with a respective position, selecting the subset of reader contacts comprises:
determining power is being drawn from a first reader contact;
determining a plurality of positions based on a position of the first reader contact and a technical specification;
selecting the subset of reader contacts based on the plurality of positions.

15. The method of claim 14, where the technical specification conforms to the Europay, Mastercard, Visa Protocol.

16. A card reader, comprising:
a frame having a slot for insertion of a chip card that has a plurality of card contacts, wherein the slot has open sides that allow the chip card to move laterally during the insertion;
a plurality of reader contacts coupled to the frame and positioned in the slot in a position to be contacted by the card contacts when the chip card is inserted in the slot, and
circuitry configured to:
communicate with the chip card through the plurality of card contact, wherein there are more reader contacts than card contacts;
determine which subset of the reader contacts engages the card contacts and to communicate with the chip card through the subset of reader contacts;
apply, for one or more reader contacts in the plurality of reader contacts, power to the respective contact;
measure, for the one or more reader contacts, whether power is being drawn from the respective contact; and
select the subset of reader contacts based on whether power is drawn from the one or more reader contacts.

* * * * *